(12) United States Patent
Pai-Paranjape et al.

(10) Patent No.: US 9,403,939 B2
(45) Date of Patent: Aug. 2, 2016

(54) PROCESSES FOR PREPARING POLYCARBONATES WITH ENHANCED OPTICAL PROPERTIES

(71) Applicant: SABIC INNOVATIVE PLASTICS IP B.V., Bergen op Zoom (NL)

(72) Inventors: Vandita Pai-Paranjape, Evansville, IN (US); Franklin J. Ehrensbeck, Evansville, IN (US); James Franklin Hoover, Evansville, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 13/781,008

(22) Filed: Feb. 28, 2013

(65) Prior Publication Data

US 2013/0225763 A1 Aug. 29, 2013

Related U.S. Application Data

(60) Provisional application No. 61/604,460, filed on Feb. 28, 2012, provisional application No. 61/658,236, filed on Jun. 11, 2012.

(51) Int. Cl.

| C08G 64/16 | (2006.01) |
|---|---|
| C08G 64/00 | (2006.01) |
| C08G 64/04 | (2006.01) |
| C08G 64/24 | (2006.01) |
| C08G 64/14 | (2006.01) |

(52) U.S. Cl.
CPC .............. *C08G 64/04* (2013.01); *C08G 64/14* (2013.01); *C08G 64/24* (2013.01)

(58) Field of Classification Search
None
See application file for complete search history.

(56) References Cited

U.S. PATENT DOCUMENTS

| 3,943,101 | A | * | 3/1976 | Vestergaard et al. | ......... 528/200 |
| 5,104,964 | A | | 4/1992 | Kuze et al. | |
| 5,142,018 | A | | 8/1992 | Sakashita et al. | |
| 5,151,491 | A | | 9/1992 | Sakashita et al. | |
| 5,243,093 | A | | 9/1993 | Kissinger et al. | |
| 6,166,167 | A | | 12/2000 | Miyamoto et al. | |
| H1943 | H | * | 2/2001 | Kissinger et al. | ............. 568/724 |
| 6,410,678 | B1 | | 6/2002 | Ishida et al. | |
| 6,815,524 | B1 | | 11/2004 | Bodiger et al. | |
| 7,314,652 | B2 | * | 1/2008 | Hay et al. | ........................ 428/1.1 |
| 2004/0166283 | A1 | * | 8/2004 | Bodiger et al. | .................. 428/98 |
| 2005/0089667 | A1 | | 4/2005 | Pai-Paranjape et al. | |
| 2006/0063906 | A1 | * | 3/2006 | Blaschke et al. | ............. 528/196 |
| 2009/0326149 | A1 | * | 12/2009 | Schultz et al. | ................. 524/841 |

FOREIGN PATENT DOCUMENTS

| CN | 1060088 A | 4/1992 |
| CN | 1339043 A | 3/2002 |
| CN | 1382178 A | 11/2002 |
| CN | 101023118 A | 8/2007 |
| CN | 1922509 B | 8/2010 |

OTHER PUBLICATIONS

Litak et al. Instrument Engineers Handbook, 4th Edition, Section 8.24 Extruder Controls, p. 1932-1945.*
Brunelle, D J: "Polycarbonates", Encylopedia of Polymer Science and Technology, Jan. 1, 2006, pp. I.1-I.33, XP002525090, DOI: 10.1002/0471440264PST255.PUB2, Retrieved from the Internet: URL: http://mrw.interscience.wiley.com/emrrw/9780471440260/epst/article/pst255/current/abstract/page 17.
International Search Report for International Application No. PCT/US0212/028242 mailed Jun. 19, 2013, 6 pages.
Written Opinion for International Application No. PCT/US0212/028242 mailed Jun. 19, 2013, 6 pages.
Office Action regarding related CN App. No. 201380011098.4; dated Jun. 18, 2015; 8 pgs.

* cited by examiner

*Primary Examiner* — Susannah Chung
*Assistant Examiner* — Robert T Butcher
(74) *Attorney, Agent, or Firm* — Cantor Colburn LLP

(57) ABSTRACT

Processes for preparing high purity polycarbonates having high light transmission, low yellowness, and color stability are disclosed herein. High purity starting ingredients are used to form a polycarbonate powder. The polycarbonate powder can be subsequently melt extruded at an optimum shear rate to minimize yellowness and the need to add colorant to overcome the yellowness. The lower amount of colorant increases the light transmission of the resulting polycarbonate resin.

27 Claims, 1 Drawing Sheet

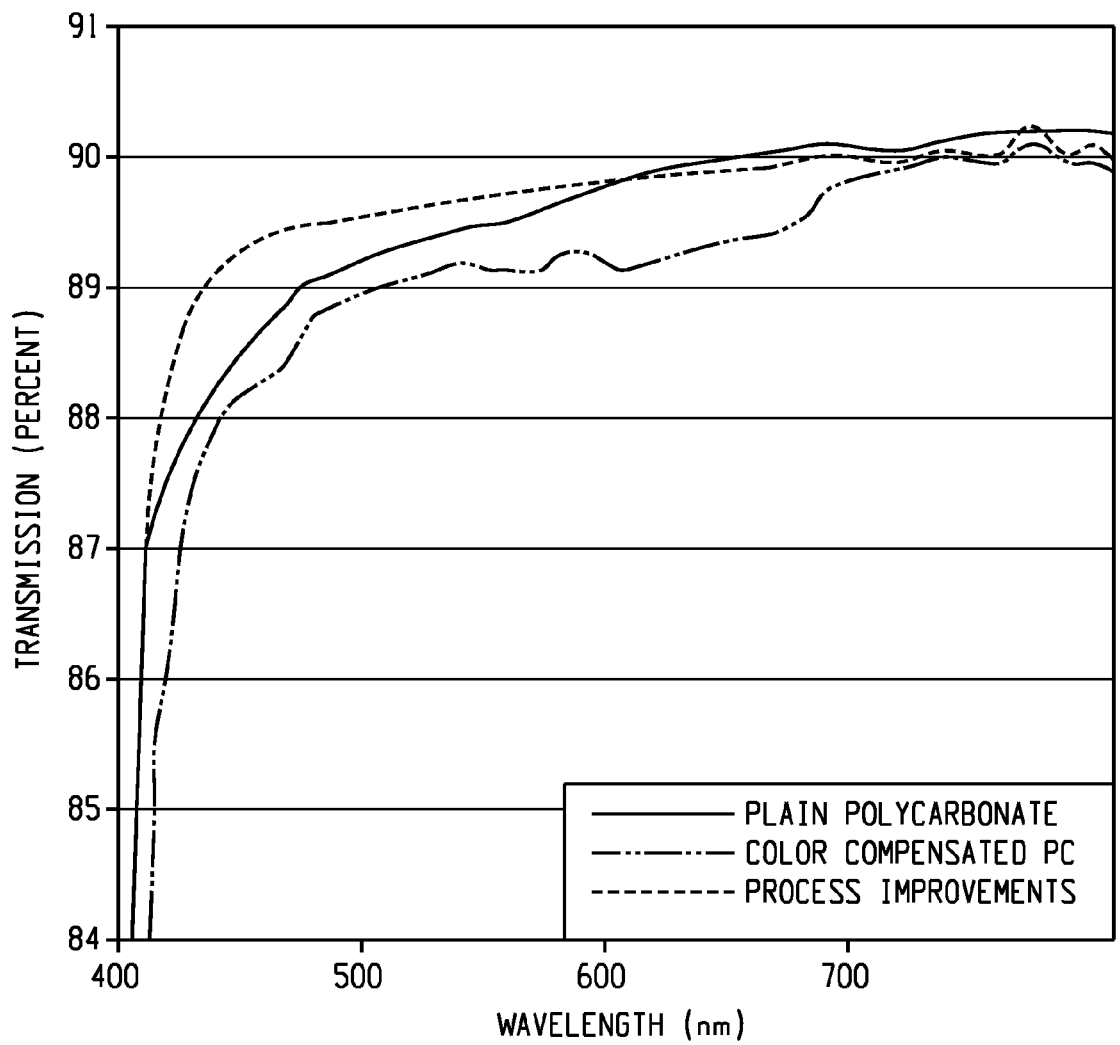

PROCESSES FOR PREPARING POLYCARBONATES WITH ENHANCED OPTICAL PROPERTIES

CROSS REFERENCE TO RELATED APPLICATIONS

This application claims priority to U.S. Provisional Patent Application 61/604,460 filed Feb. 28, 2012 and U.S. Provisional Application No. 61/658,236 filed Jun. 11, 2012, both of which are hereby incorporated by reference in their entirety.

BACKGROUND

The present disclosure relates generally to polycarbonate resins and processes for preparing polycarbonate resins that have good color, light transmission, and/or purity level properties.

Polycarbonates are a class of high-performance plastics with good impact strength (ductility). Polycarbonates, however, can age under the influence of heat, light, and time, causing reduced light transmission and color changes.

Due to various critical to quality requirements (CTQ's) of customers, especially for ophthalmic grades, there is a need to address increased transmission, color, clarity, and/or optic requirements with new polycarbonate products, and in turn there is a need to improve polycarbonate processes to make polycarbonates that meet these customer CTQ's.

BRIEF DESCRIPTION

Disclosed herein are various processes for producing polycarbonate resins having high light transmission, low yellowness, and color stability. The polycarbonate powder produced by these processes is then extruded at an optimum shear rate to produce a polycarbonate resin having low loadings of colorant.

More specifically, a process for making a polycarbonate powder includes
  combining a dihydric phenol reactant, a water immiscible solvent, water, a catalyst, a chelant, and a base to form a reaction mixture;
  reacting the reaction mixture by addition of a carbonate precursor and an endcapping agent to form a polycarbonate-containing solution; and
  purifying the polycarbonate-containing solution using high purity water to obtain polycarbonate powder;
  wherein the dihydric phenol reactant has a purity of at least 99.7%;
  wherein the water immiscible solvent contains less than 10 ppm of calcium, less than 1 ppm of iron, less than 0.5% salt, and less than 0.1% degraded polymer;
  wherein the high purity water has a conductivity of less than 10 micro-siemens/cm;
  wherein the base contains less than 10 ppm of impurities; and
  wherein the carbonate precursor contains less than 100 ppm of free chlorine.

The polycarbonate powder can be melt extruded to form the final polycarbonate resin. In some embodiments, the polycarbonate powder is melt filtered during the melt extrusion.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 1 is a graph showing the light transmission for different polycarbonates.

DETAILED DESCRIPTION

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" includes the embodiments "consisting of" and "consisting essentially of."

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that can vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms can include heteroatoms such as nitrogen, sulfur, silicon, selenium and oxygen in the backbone or can be composed exclusively of carbon and hydrogen. Aliphatic groups can be substituted or unsubstituted. Exemplary aliphatic groups include, but are not limited to, methyl, ethyl, isopropyl, isobutyl, hydroxymethyl (—$CH_2OH$), mercaptomethyl (—$CH_2SH$), methoxy, methoxycarbonyl ($CH_3OCO$—), nitromethyl (—$CH_2NO_2$), and thiocarbonyl.

The term "alkyl" refers to a linear or branched array of atoms that is composed exclusively of carbon and hydrogen. The array of atoms can include single bonds, double bonds, or triple bonds (typically referred to as alkane, alkene, or alkyne). Alkyl groups can be substituted (i.e. one or more hydrogen atoms is replaced) or unsubstituted. Exemplary alkyl groups include, but are not limited to, methyl, ethyl, and isopropyl. It should be noted that alkyl is a subset of aliphatic.

The term "aromatic" refers to an array of atoms having a valence of at least one and comprising at least one aromatic group. The array of atoms can include heteroatoms such as nitrogen, sulfur, selenium, silicon and oxygen, or can be composed exclusively of carbon and hydrogen. Aromatic groups are not substituted. Exemplary aromatic groups include, but are not limited to, phenyl, pyridyl, furanyl, thienyl, naphthyl and biphenyl.

The term "aryl" refers to an aromatic radical composed entirely of carbon atoms and hydrogen atoms. When aryl is described in connection with a numerical range of carbon atoms, it should not be construed as including substituted aromatic radicals. For example, the phrase "aryl containing from 6 to 10 carbon atoms" should be construed as referring to a phenyl group (6 carbon atoms) or a naphthyl group (10 carbon atoms) only, and should not be construed as including a methylphenyl group (7 carbon atoms). It should be noted that aryl is a subset of aromatic.

The term "cycloaliphatic" refers to an array of atoms which is cyclic but which is not aromatic. The cycloaliphatic group can include heteroatoms such as nitrogen, sulfur, selenium, silicon and oxygen in the ring, or can be composed exclusively of carbon and hydrogen. A cycloaliphatic group may comprise one or more noncyclic components. For example, a cyclohexylmethyl group ($C_6H_{11}CH_2$—) is a cycloaliphatic functionality, which comprises a cyclohexyl ring (the array of atoms which is cyclic but which is not aromatic) and a methylene group (the noncyclic component). Cycloaliphatic groups may be substituted or unsubstituted. Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The term "cycloalkyl" refers to an array of atoms which is cyclic but is not aromatic, and which is composed exclusively of carbon and hydrogen. Cycloalkyl groups may be substituted or unsubstituted. It should be noted that cycloalkyl is a subset of cycloaliphatic.

In the definitions above, the term "substituted" refers to at least one hydrogen atom on the named radical being substituted with another functional group, such as alkyl, halogen, —OH, —CN, —$NO_2$, —COOH, etc.

The term "perfluoroalkyl" refers to a linear or branched array of atoms that is composed exclusively of carbon and fluorine.

The term "room temperature" refers to a temperature of 23° C.

Clear polycarbonate resins can be used to make lenses for eyeglasses due to their excellent transparency, durability and high refractive index. The polycarbonate resin needs to possess high light transmission, low haze and be of 'optical quality', or in other words free from inclusions or defects which could compromise the quality of the lenses.

Some common shortcomings of polycarbonate resin are high initial color (yellowness) and poor color stability over time. One generally desirable class of colors of polycarbonate resins is called "natural" color. The "natural" colors are generally seen in molded articles that are transparent and are visually appealing due to their crisp, water white to light blue or slightly red-blue appearance.

One method of measuring colors is the CIELAB color space. As used herein, "CIELAB" refers to the color space standard set forth in the joint standard of the International Organization for Standardization (ISO) and the International Commission on Illumination (CIE): ISO 11664-4:2008(E)/CIE S 014-4/E:2007. This color space uses three dimensions, L*, a*, and b*. L* is the lightness or L-value, and can be used as a measure of the amount of light transmission through the polycarbonate resin. The values for L* range from 0 (black) to 100 (diffuse white). The dimension a* is a measure of the color between magenta (positive values) and green (negative values). The dimension b* is a measure of the color between yellow (positive values) and blue (negative values), and can also be referred to as measuring the blueness of the color or as the b-value. "Natural" colors can have a b-value (blueness) that ranges from slightly positive to zero and to slightly negative. In general, the b-value can be from 0.4 to −0.2. L*, a*, and b* values set forth herein are determined using a Gretag Macbeth Color Eye Spectrophotometer to carry out the CIELAB measurement/protocol.

Molded parts made from non-pigmented polycarbonates generally have a slight yellow appearance, i.e. a slightly positive b-value. To achieve a desired natural color, pigments and stabilizers can be added to the polycarbonate resin. When the polycarbonate resin has a higher yellowness, a higher amount of pigment and stabilizer is required to achieve a target blueness. However, increasing the pigment and stabilizer loading results in a lower L-value (lightness), indicating lower light transmission through the transparent molded article. A molded part that is numerically on target for blueness but requires a high loading of pigment may lack aesthetic appeal when compared to a molded part with a higher light transmission (i.e. L-value). The light transmission of the polycarbonate resin is thus affected by a combination of the yellowness index of the powder from which the resin is made, shear effects and yellowing due to polymer flow through a melt filter during extrusion of the resin, and the effect of the blue colorants added to offset the yellowness.

Color stability over time is also a critical attribute of molded parts in natural colors. Parts that show significant color change during their service life (e.g., 5 to 10 years) are often undesired.

FIG. 1 is a graph depicting these aspects through the transmission spectra of polycarbonates (light transmission (%) versus wavelength (nm)). Here, line R refers to plain polycarbonate, which has the tendency to develop a yellow tint due to light absorption stretching into the blue regions of the spectrum, and which gets worse upon heat aging. This tint can be compensated for through the addition of colorants which absorb light in the yellow region to give a neutral tint, as shown in line B. By making process improvements, one can prevent or remove absorption due to the colorants, as reflected in dotted line G.

The processes of the present disclosure are intended to improve the light transmission and cleanliness of the resulting polycarbonate resin, rendering it suitable for many applications. Making a high quality polycarbonate resin can be broken down into two areas. The first area is in the manufacture of the polycarbonate powder itself. This includes the selection of optimum raw ingredients to minimize the yellowness of the powder from which the resin is formed. The second area is the optimization of the compounding processes that form the polycarbonate resin. Here too, steps can be taken to minimize yellowness. By minimizing yellowness, the amount of pigment needed to achieve a given blueness target is decreased, which in turn increases the lightness and light transmission of the polycarbonate resin.

In this regard, the phrase "polycarbonate powder" is used to refer to polycarbonate which has not yet been molded into a final article. The phrase "polycarbonate resin" is used to refer to polycarbonate which is or has been processed into a resin for molding into a final article. Both the powder and the resin should be considered as being polymeric, or in other words not referring to a monomer.

Beginning with the manufacture of the polycarbonate powder, an interfacial polymerization process is used. Although the reaction conditions for interfacial polymerization can vary, an exemplary process generally involves dissolving or dispersing a dihydric phenol reactant in an aqueous base, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11. The most commonly used water immiscible solvents include methylene chloride, 1,2-dichloroethane, chlorobenzene, toluene, and the like. Generally, a chelant, such as an iron scavenger, is used as well to remove impurities and contaminants. A common polymerization process uses bisphenol-A (BPA) for the dihydric phenol reactant, aqueous sodium hydroxide (NaOH), and phosgene as the carbonate precursor.

The dihydric phenol reactant can be of very high purity and very low color, or put another way at least 99.8% pure. A commonly-used BPA for polycarbonates is the para,para isomer of BPA.

BPA can be produced in two grades, polycarbonate grade and epoxy grade. Polycarbonate grade BPA is higher purity and has a lower color, as measured by APHA at 325 nm. Generally, high purity BPA has a measured APHA of less than 10 while lower purity, epoxy grade BPA has an APHA of greater than 40.

BPA can be produced by the condensation of phenol with acetone. Phenol is typically used in excess, and many other impurities are formed in the condensation reaction, such as the ortho,para isomer of BPA, other oligomers, and tar. The p,p-isomer is distilled, and the excess phenol with byproducts is usually recycled. Because the excess phenol is recycled, the impurities eventually make their way into the BPA being produced. However, some commercial producers of BPA who make both epoxy grade BPA and polycarbonate grade BPA use only fresh inputs can be used for a production line producing polycarbonate grade BPA, sending the recycle streams from the polycarbonate grade line can be used in the epoxy grade line.

In the present disclosure, the BPA used to form the polycarbonate resins of the present disclosure have at least 99.8% purity. Such high quality bisphenol-A is commercially available.

Methylene chloride is usually used to form BPA. The methylene chloride can be purified by steam precipitation to leave contaminants behind. For example, the methylene chloride may contain less than 10 ppm of calcium, less than 1 ppm of iron, less than 0.5% salt, and/or less than 0.1% degraded polymer.

The aqueous base used is typically aqueous sodium hydroxide (NaOH). NaOH is used to maintain the reaction pH within a typical range of 9.5 to 10.0, and to neutralize the HCl formed from the reaction of BPA with phosgene (turning the water into brine). NaOH is made by the electrolysis of sodium chloride. One impurity formed in the electrolysis and present in the NaOH is sodium chlorate ($NaClO_3$). The amount of $NaClO_3$ can be reduced by reacting the NaOH stream with hydrogen using a ruthenium catalyst supported on carbon. However, it is not possible to guarantee that all the $NaClO_3$ present is reacted, so some will always remain in the treated NaOH solution. $NaClO_3$ is an oxidant and has been demonstrated to react with BPA. While the reaction products of $NaClO_3$ with BPA have not been completely characterized, it is believed that the oxidation of the phenol group of BPA causes the formation of quinone structures, which are typically highly colored. It has been demonstrated that producing polycarbonate resin using NaOH with high levels of $NaClO_3$ results in a resin that when molded is high in color and has poor color stability. The NaOH used in the present disclosure can contain less than 10 ppm of $NaClO_3$. Additionally, solid particulates are removed from the NaOH solution by filtration using 10 micron absolute media.

Similarly, high purity phosgene is important to the quality of the polycarbonate powder. Phosgene is produced by the reaction of carbon monoxide and chlorine. This reaction is typically run with an excess of carbon monoxide, which is inert in the interfacial polymerization. However, small amounts of un-reacted chlorine may be present in the phosgene. Chlorine can react with NaOH in the interfacial polymerization reaction to produce sodium hypochlorite (NaClO) which reacts with BPA in a manner similar to $NaClO_3$. The chlorine can also react directly with BPA. Chlorine reaction with BPA results in chlorination of the polymer backbone. Polycarbonate powder produced when free chlorine levels in the phosgene are greater than 500 ppm results in polycarbonate resin that may have greater than 200 ppm bound chlorine atoms. This resin has increased yellowness and decreased color stability. In some embodiments, the level of incorporated chlorine atoms in the polycarbonate resin is less than 20 ppm when phosgene containing less than 100 ppm free chlorine is used. Thus, it can be important to control the amount of chlorine introduced via phosgene.

The reaction of phosgene with BPA to produce the polycarbonate powder is usually run with phosgene to ensure complete molecular weight build and minimize the amount of residual, un-reacted BPA monomer. Generally, 8 to 10 mole % excess phosgene is adequate. When less than 8 mole % excess phosgene is used, there is a greater risk of incomplete batch events that result in the polymer having a weight average molecular weight (Mw) that is lower than desired, and a risk of elevated residual monomer. In some embodiments, the polycarbonate powder has less than 50 ppm of hydroxyl end groups and less than 50 ppm residual BPA monomer.

The Mw of the polycarbonate powder can be controlled by adding a chain stopping or endcapping agent. Exemplary endcapping agents include phenol, para-t-butylphenol, and p-cumyl phenol (PCP). The amount of endcapping agent can range from about 2.25 to about 5.5 mole % to give a Mw in the range of from about 36,000 to about 17,000. More commonly, the amount of chain stopping agent is from about 2.9 to about 4.3 mole % to give a Mw in the range of from about 30,000 to about 21,000.

The post reaction processing of the polycarbonate powder is also important in producing a low color and color stable polycarbonate resin. The reaction mixture, now containing polycarbonate, brine, water immiscible solvent, and impurities, may be considered to be a batch. The batch is discharged and purified through a series of purifying stages. Each stage can be made up, for example, of one or more liquid-liquid centrifuges.

In a first purifying stage, the brine phase is separated from the methylene chloride phase that contains dissolved polycarbonate.

In a second purifying stage, the catalyst is extracted from the methylene chloride phase. This can be done using dilute aqueous hydrochloric acid.

In a third purifying stage, residual ionic species are removed by washing the methylene chloride phase using high purity water. High purity water has generally been condensed from steam or has been purified using de-ionization, such that few contaminants are present in the water. For example, the conductivity of the high purity water can be less than 10 micro-siemens/cm. As a result, the polycarbonate will have low residual chloride ions. It has been shown that when water containing mineral and metal impurities such as calcium, silicate, iron, sulfate or the like is used, molded parts made from the subsequent polycarbonate resin have increased haze and yellowness.

After purification, the non-aqueous phase containing the dissolved polycarbonate may be optionally filtered using 10 micron absolute filters. The polycarbonate is then concentrated and isolated by means of steam precipitation, which instantly flashes the dichloromethane solvent during direct contact with steam. The steam used for precipitation can be low in mineral and ion content, for example with a conductivity value of less than 10 micro-siemens/cm, more specifically less than one micro-siemens/cm. Precipitation of resin using steam with high mineral or ion content (e.g., greater than 10 micro-siemens/cm) can result in high yellowness and poor melt stability for the polycarbonate resin.

The dichloromethane and steam vapors are separated from the wet polycarbonate. The dichloromethane and steam vapors can themselves be condensed and separated. The recovered dichloromethane is high purity by virtue of being flashed, and can be reused in future polymerization of BPA. The recovered water is also high purity, and can be used in the purifying stages for washing or the extraction of catalyst. The recovered catalyst/water mixture can be reused in future polymerization of BPA.

Residual dichloromethane can be removed from the wet polycarbonate in a plug flow column using counter current steam flow. Residual water can be removed from the wet polycarbonate in a fluid bed dryer using heated air. The resulting polycarbonate powder can then be collected.

To summarize, a number of steps can be taken to produce high purity polycarbonate powder. High purity BPA that is low color and especially color stable is used. The NaOH base can be low in sodium chlorate content and can be filtered. The phosgene can be low in non-reacted chlorine content. Conservative reaction conditions can help ensure that relatively complete polymerization is achieved. High purity water can be used during the purifying stages of obtaining the polycarbonate powder.

Next, the compounding processes that form the polycarbonate resin can be optimized as well.

Initially, the high purity polycarbonate powder which has been made can be isolated and segregated to designated silos in the compounding operation. Each silo can be cleaned of any residual powder to ensure there is no cross-contamination. The transfer lines used to move polycarbonate powder from the silos to the extrusion line can also be cleaned out prior to transferring. Filtered air can be used for transferring. Any additives (colorants, stabilizers, etc.) can be metered directly into the extruder using dedicated feeders.

The compounding of the polycarbonate powder is performed in an extruder. An extruder can be used for compounding, molding, pelletization or forming films, sheets or profiles. Such extruders typically have a heated extrusion barrel and one or two screws revolving within the barrel to compress, melt, and extrude the polycarbonate through an orifice in an extrusion nozzle. The barrel is divided into several different zones, such as feed, transition, mixing, dispersion, and metering zones.

The polycarbonate, along with additives, is melt extruded at a controlled temperature. 58 mm or 70 mm extruders are typically used for high-grade polycarbonate resins. The polycarbonate is typically melt filtered through a 30 micron (μm) to 70 μm, e.g. 70 μm, filter stack to reduce particulate contamination. It is possible to use a smaller mesh filter (10 um) to further improve the quality of the product. Stainless steel water baths with 0.5 micron-filtered water can be used to minimize contamination. Polycarbonate resin exiting the extruder can be pelletized and collected in packaging such as bulk boxes or super sacks. Care is taken during the extrusion and packaging processes to exclude particulates that may be present in air and water transfer systems.

In this respect, two aspects of the compounding process are relevant to obtaining the high purity polycarbonate resins of the present disclosure. First, as the melt filter sizes get smaller, shear forces and heat increase as the polycarbonate passes through the filter channels. This increases yellowness in the resulting polycarbonate.

Second, the amount of blue colorants added to the polycarbonate to offset the yellowness can vary. Once the extruder has reached stable operating state and pellets are being produced, a small sample of pellets can be molded into a color plaque at a specified thickness. Color measurements can be recorded and compared to the target specifications of the product. The amount of colorant or their strength can then be adjusted to bring the polycarbonate product within specifications. Again, by controlling the yellowness of the polycarbonate, the amount of colorant needed to meet the colorant specification (b*) can be reduced, which increases the brightness (L*).

To obtain the high purity polycarbonate of the present disclosure having increased light transmission and cleanliness, the feed rate to the extruder, the torque of the extruder, the set point for the colorant, and the temperature of the extruder need to be optimized. This can be done using a feedback loop to obtain the target product. The colorant is typically measured as a percentage of the line rate. The torque is generally between 70% and 90%.

Although described above in terms of bisphenol-A, the present processes are generally useful for making various polycarbonates. As used herein, the term "polycarbonate" means a polymer having repeating structural carbonate units of the formula (1):

(1)

in which at least about 60 percent of the total number of $R^1$ groups are aromatic organic radicals and the balance thereof are aliphatic, alicyclic, or aromatic radicals. An ester unit (—COO—) is not considered a carbonate unit, and a carbonate unit is not considered an ester unit. In one embodiment, each $R^1$ is an aromatic organic radical, for example a radical of the formula (2):

(2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene, or isopropylidene.

Polycarbonates can be produced by the interfacial reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

$$HO\text{-}A^1\text{-}Y^1\text{-}A^2\text{-}OH \quad (3)$$

wherein $Y^1$, $A^1$ and $A^2$ are as described above. Also included are bisphenol compounds of general formula (4):

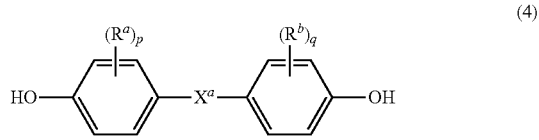

wherein $R^a$ and $R^b$ each represent a halogen atom or a monovalent hydrocarbon group and can be the same or different; p and q are each independently integers of 0 to 4; and $X^a$ represents one of the groups of formula (5):

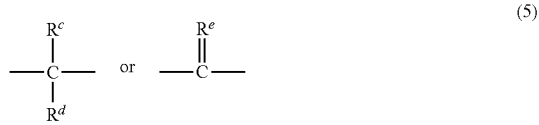

wherein $R^c$ and $R^d$ each independently represent a hydrogen atom or a monovalent linear or cyclic hydrocarbon group and $R^e$ is a divalent hydrocarbon group.

Specific examples of the types of bisphenol compounds represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl)propane, and 2-phenyl-3,3-bis(4-hydroxyphenyl)phthalimidine ("PPPBP"). Combinations comprising at least one of the foregoing dihydroxy compounds can also be used.

Branched polycarbonates are also useful, as well as blends of a linear polycarbonate and a branched polycarbonate. The branched polycarbonates can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of about 0.05 wt % to about 2.0 wt %.

"Polycarbonate" as used herein further includes blends of polycarbonates with other copolymers comprising carbonate chain units. An exemplary copolymer is a polyester carbonate, also known as a copolyester-polycarbonate. Such copolymers further contain, in addition to recurring carbonate chain units of the formula (1), repeating units of formula (6):

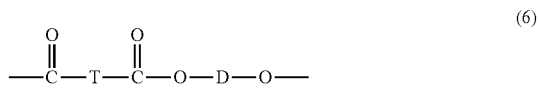

wherein D is a divalent radical derived from a dihydroxy compound, such as a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, such as a $C_{2-10}$ alkylene radical, a $C_{6-20}$ alicyclic radical, a $C_{6-20}$ alkyl aromatic radical, or a $C_{6-20}$ aromatic radical. In other embodiments, dicarboxylic acids that contain a C4-C36 alkylene radical can be used to form copolymers of formula (6). Examples of such alkylene radicals include adipic acid, sebacic acid, or dodecanoic acid.

In one embodiment, D is a $C_{2-6}$ alkylene radical. In another embodiment, D is derived from an aromatic dihydroxy compound of formula (7):

wherein each $R^k$ is independently a $C_{1-10}$ hydrocarbon group, and n is 0 to 4. The halogen is usually bromine. Examples of compounds represented by the formula (7) include resorcinol, substituted resorcinol compounds such as 5-methyl resorcinol, 5-phenyl resorcinol, 5-cumyl resorcinol, or the like; catechol; hydroquinone; substituted hydroquinones such as 2-methyl hydroquinone, 2-t-butyl hydroquinone, 2-phenyl hydroquinone, 2-cumyl hydroquinone, 2,3,5,6-tetramethyl hydroquinone, or the like; or combinations comprising at least one of the foregoing compounds.

Examples of aromatic dicarboxylic acids that can be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof.

In other embodiments, poly(alkylene terephthalates) can be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters.

Copolymers comprising alkylene terephthalate repeating ester units with other ester groups may also be useful. Ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexanedimethanol-1,4-cyclohexanedicarboxylate) (PCCD), having recurring units of formula (8):

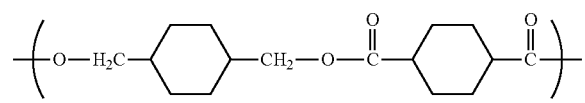

(8)

wherein, as described using formula (6), $R^2$ is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

Another exemplary copolymer comprises polycarbonate blocks and polydiorganosiloxane blocks, also known as a polycarbonate-polysiloxane copolymer. The polycarbonate blocks in the copolymer comprise repeating structural units of formula (1) as described above, for example wherein $R^1$ is of formula (2) as described above. These units can be derived from reaction of dihydroxy compounds of formula (3) as described above.

The polydiorganosiloxane blocks comprise repeating structural units of formula (9) (sometimes referred to herein as 'siloxane'):

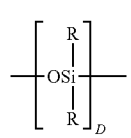

(9)

wherein each occurrence of R is same or different, and is a $C_{1-13}$ monovalent organic radical. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups can be used in the same copolymer. Generally, D can have an average value of 2 to about 1000, specifically about 2 to about 500, more specifically about 5 to about 200, and more specifically about 10 to about 75. Where D is of a lower value, e.g., less than about 40, a relatively larger amount of the polycarbonate-polysiloxane copolymer can be used. Conversely, where D is of a higher value, e.g., greater than about 40, a relatively lower amount of the polycarbonate-polysiloxane copolymer can be used.

In one embodiment, the polydiorganosiloxane blocks are provided by repeating structural units of formula (10):

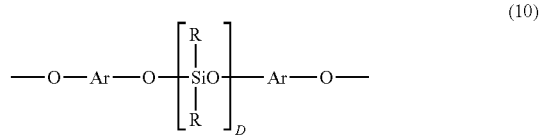

(10)

wherein D is as defined above; each R may be the same or different, and is as defined above; and each Ar may be the same or different, and is a substituted or unsubstituted $C_6$-$C_{30}$ arylene radical, wherein the bonds are directly connected to an aromatic moiety. Suitable Ar groups in formula (10) can be derived from a $C_6$-$C_{30}$ dihydroxyarylene compound, for example a dihydroxyarylene compound of formula (3), (4), or (7) above. Combinations comprising at least one of the foregoing dihydroxyarylene compounds can also be used.

Such units can be derived from the corresponding dihydroxy compound of the following formula (11):

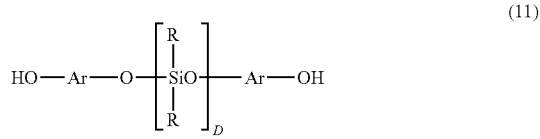

(11)

wherein Ar and D are as described above. Compounds of this formula can be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (12):

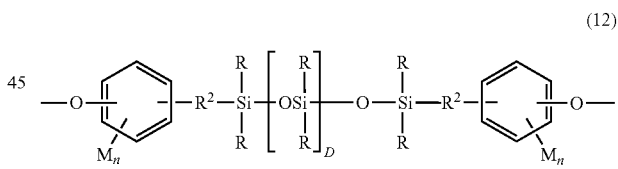

(12)

wherein R and D are as defined above. $R^2$ in formula (12) is a divalent $C_2$-$C_8$ aliphatic group. Each M in formula (12) may be the same or different, and can be cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is an alkyl group such as methyl, ethyl, or propyl, an alkoxy group such as methoxy, ethoxy, or propoxy, or an aryl group such as phenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl or tolyl. In another embodiment, R is methyl, or a mixture of methyl and phenyl. In still another embodiment, M is methoxy, n is one, $R^2$ is a divalent $C_1$-$C_3$ aliphatic group, and R is methyl.

These units can be derived from the corresponding dihydroxy polydiorganosiloxane (13):

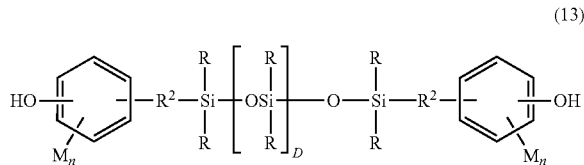

(13)

wherein R, D, M, $R^2$, and n are as described above.

Such dihydroxy polysiloxanes can be made by effecting a platinum catalyzed addition between a siloxane hydride of the formula (14),

(14)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing can also be used.

In specific embodiments of the present disclosure, the polycarbonate resin is derived from a dihydroxy compound having the structure of Formula (I):

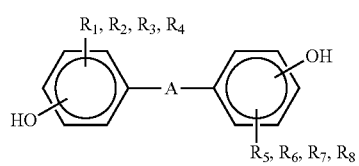

Formula (I)

wherein $R_1$ through $R_8$ are each independently selected from hydrogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic.

In specific embodiments, the dihydroxy compound of Formula (1) is 2,2-bis(4-hydroxyphenyl)propane (i.e. bisphenol-A or BPA). Other illustrative compounds of Formula (I) include: 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 1,1-bis(4-hydroxyphenyl)cyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene.

In more specific embodiments, the polycarbonate resin is a bisphenol-A homopolymer. The polycarbonate resin can have a weight average molecular weight (Mw) of from about 15,000 to about 35,000 daltons, according to polycarbonate standards, including a range of from about 15,000 to about 22,000 daltons. The polycarbonate resin can be a linear or branched polycarbonate, and in more specific embodiments is a linear polycarbonate.

As previously described above, a chain stopper (or end-capping agent) can be included during the interfacial polymerization. The chain-stopper limits molecular weight growth rate, and so controls molecular weight in the polycarbonate blocks. Exemplary chain-stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can also be used. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Other additives ordinarily incorporated in polycarbonate compositions of this type can also be used, with the proviso that the additives are selected so as to not significantly adversely affect the target properties of the polycarbonate, for example, low yellowness and high light transmission. Combinations of additives can be used. Such additives can be mixed at a suitable time during the mixing of the components for forming the composition. In embodiments, one or more additives are selected from at least one of the following: UV stabilizing additives, thermal stabilizing additives, mold release agents, colorants, and gamma-stabilizing agents.

Exemplary antioxidant additives include, for example, organophosphites such as tris(nonyl phenyl)phosphite, tris(2,4-di-t-butylphenyl)phosphite (e.g., "IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 wt % of the overall polycarbonate composition.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 wt % of the overall polycarbonate composition.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to 1 wt % of the overall polycarbonate composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl) oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 0.0001 to 1 wt % of the overall polycarbonate composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 wt %, specifically 0.01 to 0.75 wt %, more specifically 0.1 to 0.5 wt % of the overall polycarbonate composition.

Colorants such as pigment and/or dye additives can also be present in order to offset any color that may be present in the polycarbonate resin and to provide desired color to the customer. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 wt % of the overall polycarbonate composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly (C2-8) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 wt % of the overall polycarbonate composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexanediol, and the like;

cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH2OH) or it can be a member of a more complex hydrocarbon group such as —CR$^4$HOH or —CR$^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 wt % of the overall polycarbonate composition.

While various types of polycarbonates could potentially be used in accordance with embodiments and are described in detail below, of particular interest are BPA polycarbonates, such as LEXAN polycarbonate (LEXAN is a trademark of SABIC Innovative Plastics IP B. V.). LEXAN polycarbonate can be used for a wide range of applications that make use of its interesting combination of mechanical and optical properties. Its high impact resistance can make it an important component in numerous consumer goods such as mobile phones, MP3 players, computers, laptops, etc. Due to its transparency this BPA polycarbonate can find use in optical media, automotive lenses, roofing elements, greenhouses, photovoltaic devices, safety glass, eyeglass and other ophthalmic articles, and signage. The developments in light emitting diode (LED) technology have led to significantly prolonged lifetimes for the lighting products to which this technology can be applied. This has led to increased requirements on the durability of polycarbonates, in particular on its optical properties. In other applications such as automotive lighting, product developers may specify increasingly complex shapes which cannot be made out of glass and for which the heat requirements are too stringent for polymethyl methacrylate (PMMA). Also in these applications polycarbonate is the material of choice, but the high transparency of PMMA and glass can be approached as closely as possible.

The following examples are provided to illustrate the polycarbonates, articles, and methods of the present disclosure. The examples are merely illustrative and are not intended to limit the disclosure to the materials, conditions, or process parameters set forth therein.

EXAMPLES

Table 1 shows a typical formulation used for ophthalmic grades containing a mixture of high and low molecular weight polycarbonates (adjusted as necessary to hit melt flow targets), UV and heat stabilizers and mold release.

TABLE 1

| CAS | Ingredient | Weight % |
| --- | --- | --- |
| 111211-39-3 | Polycarbonate with Mw ~21,000 | 9.93 |
| 111211-39-3 | Polycarbonate with Mw ~30,000 | 89.33 |
| 3147-75-9 | CYASORB UV541, UV stabilizer | 0.20 |
| 115-83-3 | Pentaerythritol tetrastearate | 0.40 |
| 26523-78-4 | Trisnonyl phenyl phosphite | 0.00 |
| 31570-04-4 | IRGAFOS 168, phosphite stabilizer | 0.06 |
| 10294-56-1 | Phosphorous acid solution (0.15%) | 0.09 |

Example 1

Two polycarbonates were made, one using high purity polycarbonate and one using lower grade regular polycarbonate. The two polycarbonates were made to meet the same color specification (b-value) by the addition of two blue dyes (R72—Solvent Violet 36 and R7260—Pigment Blue 60) during extrusion. The L* and color feeder set points were then compared to each other.

The high purity polycarbonate had a starting yellowness index of about 1.0, while the regular polycarbonate had a starting yellowness index of about 1.2 (according to ASTM D6290). The resulting setpoints for each blue dye are shown below in Table 2.

TABLE 2

| | R72 setpoint | R7260 setpoint |
| --- | --- | --- |
| Regular polycarbonate | 0.154 | 0.111 |
| High purity polycarbonate | 0.100 | 0.085 |
| % reduction | 35% | 23.40% |

As can be seen in Table 2, the use of the high purity polycarbonate resulted in a significant decrease in the amount of colorant needed to meet color specifications. A comparison of the L* for the high purity polycarbonate (measured on a 200 mil/5.08 mm color chip, where 1 mil is one-thousandths of an inch) was performed against the historical values for the L* of regular polycarbonate. The high purity polycarbonate had a L* of 95.3. In comparison, the average L* for the regular polycarbonate was 94.8.

Example 2

A polycarbonate was made to illustrate the optimization processes of the present disclosure. The acceptable melt flow value for this polycarbonate was between 6.2 to 8.7 g/10 min. As to color, the target and lower specification limit (LSL) are shown in Table 3.

TABLE 3

| | Target | LSL |
| --- | --- | --- |
| L* | 95.10 | 94.70 |
| a* | −0.21 | −0.36 |
| b* | 0.33 | 0.20 |

A higher L* can be beneficial (i.e. closer to 100), and a lower b* can be beneficial (i.e. closer to zero or negative). In this regard, natural colors are neither strongly yellow nor strongly blue in a molded article.

Table 4 shows the process of optimization here. The color feeder setpoint, melt flow rate (MFR), feed rate to the extruder, and the torque are shown, along with the resulting color space values. The MFR was measured according to ASTM D1238. The color feeder is shown in units of % of the master line rate (the line rate is measured in lbs/hr). The feed rate is shown in units of lbs/hour.

TABLE 4

| Stage | L* | a* | b* | Color feeder | MFR | Feed Rate (lbs/hr) | Torque (%) |
|---|---|---|---|---|---|---|---|
| 1 | 94.44 | −0.28 | 0.74 | 0.38 | 16.5 | 1600 | 75 |
| 2 | 94.65 | −0.15 | 0.11 | 0.38 | 13.7 | 1400 | 75 |
| 3 | 94.72 | −0.08 | 0.00 | 0.32 | 12.8 | 1300 | 75 |
| 4 | 94.93 | −0.14 | 0.24 | 0.25 | 9.9 | 1200 | 75 |
| 5 | 94.95 | −0.17 | 0.26 | 0.24 | 8.8 | 1200 | 80 |
| 6 | 94.95 | −0.16 | 0.21 | 0.24 | 8.6 | 1200 | 80 |
| 7 | 94.95 | −0.16 | 0.21 | 0.24 | 8 | 1200 | 80 |
| 8 | 94.88 | −0.19 | 0.40 | 0.25 | 7.6 | 1150 | 80 |

In stage 1, the product was out of specification for L*, b*, and MFR. Reducing the feed rate down to 1200 lbs/hr improved these three values, but the MFR was still out of specification.

In stage 5, the torque was increased to 80%. The color feeder setpoint was also reduced, and stages 6-8 are generally meet the color specifications and show that different MFRs can be obtained. Optimizing the shear rate reduces yellowing of the polycarbonate, thus reducing the amount of colorant that needs to be added to meet color specifications.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A process for making a polycarbonate powder, comprising:
   combining a dihydric phenol reactant, a water immiscible solvent, water, a catalyst, a chelant, and a base to form a reaction mixture;
   reacting the reaction mixture by addition of a carbonate precursor and an endcapping agent to form a polycarbonate-containing solution; and
   purifying the polycarbonate-containing solution using high purity water to obtain polycarbonate powder;
   wherein the dihydric phenol reactant is BPA having a purity of at least 99.8% and is produced in a process using fresh phenol that is free of recycled phenol from the BPA production process;
   wherein the water immiscible solvent contains less than 10 ppm of calcium, less than 1 ppm of iron, less than 0.5% salt, and less than 0.1% degraded polymer;
   wherein the high purity water has a conductivity of less than 10 micro-siemens/cm;
   wherein the base contains less than 10 ppm of impurities; and
   wherein the carbonate precursor contains less than 100 ppm of free chlorine.

2. The process of claim 1, wherein the pH of the reaction mixture is maintained at a pH of from about 9.5 to about 10.0 during the reaction.

3. The process of claim 1, wherein the polycarbonate-containing solution is purified by a process comprising:
   discharging the polycarbonate-containing solution into a first purifying stage that removes brine;
   feeding the polycarbonate-containing solution from the first purifying stage into a second purifying stage that removes the catalyst by extraction with an acid; and
   feeding the polycarbonate-containing solution from the second purifying stage into a third purifying stage that washes the polycarbonate-containing solution with the high purity water.

4. The process of claim 1, wherein the dihydric phenol reactant is bisphenol-A (BPA) or a dihydroxy aromatic monomer.

5. The process of claim 1, wherein the water immiscible solvent is methylene chloride, 1,2-dichloroethane, chlorobenzene, or toluene.

6. The process of claim 5, wherein the water immiscible solvent is methylene chloride.

7. The process of claim 1, wherein the catalyst is triethylamine.

8. The process of claim 1, wherein the chelant is an iron scavenger.

9. The process of claim 1, wherein the base is sodium hydroxide (NaOH).

10. The process of claim 1, wherein the carbonate precursor is phosgene.

11. The process of claim 1, wherein carbonate precursor is phosgene, and the phosgene is added in an excess of from 8 mole % to 10 mole % based on the amount of the BPA.

12. The process of claim 1, wherein the endcapping agent is added in an amount of about 2.25 to about 5.5 mole % of the dihydric phenol reactant.

13. The process of claim 1, further comprising filtering the base or a non-aqueous phase resulting from the purification with high purity water before formation of the polycarbonate powder, with 10 micron absolute filter media.

14. The process of claim 1, further comprising melt extruding the polycarbonate powder.

15. The process of claim 14, wherein the shear rate during melt extruding is optimized by controlling the polycarbonate feed rate into an extruder and the torque of the extruder.

16. The process of claim 15, further comprising controlling a colorant feed rate into the extruder and temperature of the extruder.

17. The process of claim 14, further comprising melt filtering during the melt extruding.

18. The process of claim 17, wherein the melt filtering uses a filter stack that has a pore size of 30 μm to 70 μm.

19. The process claim 17, wherein the melt filtering uses a filter stack that has a pore size of 70 μm.

20. The process of claim 14, wherein colorant is added at a feed rate of less than 0.20% of a feed rate of a master line during the melt extruding.

21. The process of claim 1, further comprising concentrating and isolating the polycarbonate with steam precipitation after the purification with high purity water.

22. The process of claim 1, wherein the polycarbonate has a (b*) of from 0.4 to −0.2 and a (L*) of at least 94.7 according to CIELAB, when measured on a test sample having a thickness of 5.08 mm.

23. The process of claim 1, wherein the polycarbonate has a (L*) of greater than 95 according to CIELAB, when measured on a test sample having a thickness of 5.08 mm.

24. The process of claim 1, further comprising molding the polycarbonate powder or a polycarbonate resin derived from the polycarbonate powder to form a molded article.

25. The process of claim 24, wherein the article is a lens, an ophthalmic lens, a light emitting diode housing, a light transmission medium, a reflector, an automotive lens, luminaire housing, light guide, or a light pipe.

26. A process for making a polycarbonate powder, comprising:

combining a dihydric phenol reactant, a water immiscible solvent, water, a catalyst, a chelant, and a base to form a reaction mixture;

reacting the reaction mixture by addition of a carbonate precursor and an endcapping agent to form a polycarbonate-containing solution; and purifying the polycarbonate-containing solution using high purity water, and steam precipitating to obtain polycarbonate powder;

wherein the dihydric phenol reactant is BPA having a purity of at least 99.8% and is produced in a process using fresh phenol that is free of recycled phenol from the BPA production process;

wherein the water immiscible solvent contains less than 10 ppm of calcium, less than 1 ppm of iron, less than 0.5% salt, and less than 0.1% degraded polymer;

wherein the high purity water has a conductivity of less than 10 micro-siemens/cm;

wherein the base contains less than 10 ppm of sodium chlorate; and wherein the carbonate precursor contains less than 100 ppm of free chlorine.

27. The process of claim 1, wherein the high purity water has a conductivity of less than 1 micro-siemens/cm.

* * * * *